UNITED STATES PATENT OFFICE.

EUGENE C. SULLIVAN AND WILLIAM C. TAYLOR, OF CORNING, NEW YORK, ASSIGNORS TO CORNING GLASS WORKS, OF CORNING, NEW YORK, A CORPORATION OF NEW YORK.

GLASS.

1,304,623.   Specification of Letters Patent.   Patented May 27, 1919.

No Drawing. Original application filed June 24, 1915, Serial No. 36,136. Divided and this application filed September 18, 1916. Serial No. 120,758.

*To all whom it may concern:*

Be it known that we, EUGENE C. SULLIVAN and WILLIAM C. TAYLOR, both citizens of the United States of America, and residents of Corning, New York, have invented certain new and useful Improvements in Glasses, of which the following is a specification.

In our prior application filed June 24, 1915, Sr. No. 36,136, we showed, described and claimed a glass baking dish and compositions for a glass suitable for fabrication into such dishes. The United States Patent Office has required a division of such application between the claims on the article and those on the composition and accordingly the present application is filed. Glass compositions A, $B_1$, C, D and E given herein are compositions given in the prior application. Composition $B_2$ given herein is specified because it is a composition which has been put into extensive commercial use and because its physical properties have been carefully and accurately determined.

Our invention has for its object to provide a new glass (that is to say a substance containing silica in combination with various bases and acids) especially adapted for fabrication into pressed or blown ware intended for culinary or laboratory uses. For these purposes it is desirable that the glass have the following properties.

(A) A high co-efficient of thermal endurance, as hereinafter defined.

(B) High stability, that is to say, power to resist chemical attack.

It is well known that certain glass making materials tend, when incorporated in the glass, to produce one or more of the desirable results, but in so doing, many of them also work against other desirable results, and in advance of an actual test, it cannot be predicted how a variation of the relative proportions of the different ingredients will affect certain of the named factors. This invention therefore consists in the selection of certain known glass making materials in such relative proportions as will result in a glass having the named properties combined in such manner as to adapt such glass for the purpose stated, and in a glass having certain desired properties.

Generally speaking, the present invention contemplates a glass for the purposes stated, characterized by one or more of the following features,—

(1) It is boro-silicate of high stability having a linear co-efficient of expansion less than .000004 and a high thermal conductivity (*i. e.* as high as .0028).

(2) In it the molecular ratio of silica to base is greater than 13 to 1, (tending to high stability (resistance to attack of reagents) and low expansivity), while at the same time its hardness (as measured in the manner hereinafter stated) is less than 900°.

(3) In it the molecular ratio of acid oxid or oxids to basic oxid or oxids is not less than 15 to 1.

(4) It has a co-efficient of thermal endurance greater than 6.

(5) It has a stability better than .002 grams per 100 sq. cm. when measured in the manner hereinafter stated.

It more specifically comprises a boro-silicate glass, in which no oxids of the second group of the periodic system are present in quantities sufficient to make them material constituents, containing over 75 per cent. of silica, and having a hardness of about 800° C.

As examples of glass compositions falling within our invention, we give the following,—

|         | A.  | $B_1$. | $B_2$. | C.  | D.   | E.  |
|---------|-----|--------|--------|-----|------|-----|
| $SiO_2$ | 70  | 80.6   | 80.9   | 90  | 85   | 90  |
| $B_2O_3$| 20  | 13     | 12.9   | 6   | 12.5 | 5   |
| $Na_2O$ | 4   | 4.4    | 4.4    | 3   | 1.5  |     |
| $Al_2O_3$| 6  | 2      | 1.8    | 1   |      | 2   |
| $Sb_2O_3$|    |        |        |     | 1    |     |
| $Li_2O$ |     |        |        |     |      | 3   |
| Total.  | 100 | 100    | 100    | 100 | 100  | 100 |

All of the glasses given above have the following physical characteristics,—

(1) A linear thermal expansivity less than .000004, between 20° C. and 300° C., the co-efficient of expansion of glass (A) being .0000037; of B, .0000034; of $B_2$, .0000033; of C., .0000023, and of D, .0000022.

(2) A relatively high co-efficient of true internal heat conductively, viz., .0028 calories per second per degree C. for each square centimeter of plate 1 cm. thick, for glasses A, B, and $B_2$, and about .0030 for C.

(3) Tenacity, modulus of elasticity density and specific heat of such values that in connection with their expansivity and conductivity the glasses have a high co-efficient of thermal endurance. This factor, which is the power to undergo sudden cooling without fracture, is expressed by Winkelmann and Schott (*Ann. d. Phys. u. Chem.* 51–730 (1894); also Hovestadt, *Jena Glass*, published by MacMillan 1902, p. 228), as follows:—

$$F = \frac{P}{AE}\sqrt{\frac{K}{Sc}}$$

in which—

F = co-efficient of thermal endurance,
P = tensile strength,
$a$ = the linear expansivity,
E = Young's modulus of elasticity,
K = heat conductivity,
S = density,
$c$ = specific heat.

If the cubic expansivity is used in the formula, instead of the linear expansivity the result would be $\frac{F}{3}$, and these values of $\frac{F}{3}$ are used for comparing glasses. The values of $\frac{F}{3}$ calculated by Winkelmann and Schott for glasses of various composition range between 1.17 and 484.

In calculating $\frac{F}{3}$ Winkelmann and Schott use a figure for the tensile strength which is undoubtedly too low, their tensile strength determination having been made by a method which they themselves recognized tended to give low results.

Using factors of tensile strength for our glasses, such as would be given by them under the test methods of Winkelmann and Schott, the cubic co-efficient of thermal endurance $\left(\frac{F}{3}\right)$ of all of our glass is greater than 6. In specifying thermal endurance in our claims, we will base them on such factors. Using the actual tensile strength of our glasses the factor is still higher.

(4) High stability against chemical attack. As illustrative of this, it may be stated that a glass of composition $B_2$, after being subjected to the solvent action of distilled water at 80° C. for 48 hours (see for procedure, Walker, *Journal of the American Chemical Society*, vol. 27, p. 865, 1905) has only .0001 to .0005 grams of matter dissolved per 100 sq. cm. exposed to the solvent action, while all of the compositions here given have a stability better than .002 grams per 100 sq. cm.

(5) Good workability. This includes the ability to properly melt the glass at the temperatures readily obtainable in ordinary glass furnaces. It also includes the property of remaining amorphous, and of being sufficiently plastic at a point below the furnace temperature to permit its working in the ordinary manner by blowing, pressing, etc. This latter property may be expressed numerically by the temperature on the centigrade scale, at which a thread of the glass 1 mm. in diameter and 23 cm. in length suspended vertically and heated through the upper 9 cm. elongates of its own weight at the rate of 1 mm. per minute. A glass doing this at the temperature of 800° C. is said to have a hardness equal to, (or no greater than) 800° C. Glasses A, $B_1$, and $B_2$ have a hardness of about 800° C., D of about 862° C., while C and E have a hardness above 862° C., and below 900° C.

(6) The glasses are all colorless and are transparent.

Chemically, the compositions above given are characterized,—

(7) By high silica contents (*i. e.* not less than 70%). This tends to low expansivity and good stability, but tends to render the glass hard.

It will be noted that in all of the above formulæ the percentage of alumina is very low, as is desirable in order to reduce the hardness of the glass. Alumina has been heretofore used in sodium-boro-silicate glasses in larger percentages in order to obtain ability to resist chemical attack and prevent crystallization, but we find it possible to still achieve these desirable results while reducing the alumina contents, and to increase as stated, in a suitable mixture, the silica contents to 70 per cent. or over, and that the expansion with such percentages is less than would be inferred from the hitherto known properties of silica. From our investigations we have discovered that with these high percentages of silica, the unit expansion factor of the silica is apparently less than the unit factor for less percentages of silica, or in other words that when the percentage of silica is made sufficiently great the factor by which its percentage is to be multiplied to obtain the thermal expansion due to the silica is reduced. If the silica content is increased to above 84 per cent., which is thus rendered possible, while maintaining low expansion, the alumina contents may be decreased, say to one per cent., owing to the fact that with high silica contents suitably combined, but little alumina is required to give requisite resistance to chemical attack, and freedom from tendency to crystallize. In composition D, the antimony, and composition E, the lithia, serves to soften the glass without decreasing the resistance to chemical attack as would the amount of soda or potash requisite to soften the glass to the same extent.

Indeed the alumina of compositions A, $B_1$, $B_2$, C and E may be entirely dropped, being replaced by an equal amount of silica. This, while effecting changes in the characteristics of the glass, is within the scope of certain aspects of our invention and the resultant glasses are useful, although not embodying desirable features to the same extent as the compositions given. Thus if this change be made in composition $B_1$, the resultant glass would be lower in expansivity, softer, less stable and more inclined to crystallize than the glass of composition $B_1$.

(8) In combining with the low expansivity due to the high silica contents, and with good stability, good workability, this being due to the compositions employed, in which a relatively high ratio of boric oxid to alkali, is present, this ratio in none of the cases given, being less than 2 to 1, the boric oxid (except for compositions E) being between 60 and 70 per cent. of constituents other than the silica. It is possible to replace a part of the sodium oxid given in the formulæ with potassium oxid. To obtain the same hardness, two parts of sodium oxid may be replaced by three parts of potassium oxid, while for the same expansivity, five parts of sodium oxid may be replaced by six parts of potassium oxid. In this specification, the proportions of alkali will be stated in terms of sodium oxid, it being understood that such alkali may be replaced by potassium oxid in the proportions stated. It will be noted in glass E, lithia forms the alkali.

(9) The relative simplicity of the compositions, all of the five given containing four ingredients each, at least two of which are acid oxids (silica and boric oxids), and a basic oxid (soda or lithia). Alumina and the antimony oxid probably act as acids in the composition, and will for purposes of description be so considered. This simplicity of composition is of advantage in connection with chemical glass-ware by reducing the number of elements which may be taken up from the glass by substances undergoing analysis or treatment therein.

It will be noted that in the compositions given, the molecular ratios of silica to bases and of acidic oxids to basic oxids are high. The first ratio for A is 18 to 1; for B, 18.9 to 1; for $B_2$, 19 to 1; for C, 31 to 1; for D, 51 to 1; and for E, 15 to 1; while the second ratio for A, is 23 to 1; for $B_1$, 21.4 to 1; for $B_2$, 21.6 to 1; for C, 33 to 1; for D, 58 to 1; for E, 15.7 to 1; the molecular formulæ of the several compositions being as follows,—

| | A. | $B_1$. | $B_2$. | C. | D. | E. |
|---|---|---|---|---|---|---|
| $SiO_2$ | 1.167 | 1.345 | 1.348 | 1.5 | 1.417 | 1.5 |
| $B_2O_3$ | .286 | .186 | .184 | .0857 | .179 | .0714 |
| $Na_2O$ | .0645 | .071 | .071 | .0464 | .0242 | |
| $Al_2O_3$ | .06 | .02 | .018 | .01 | | .02 |
| $Sb_2O_3$ | | | | | .0035 | |
| $Li_2O$ | | | | | | .01 |

It will be noted that none of the oxids of the second group of the periodic system (e. g. lime and magnesia) are present, for while these oxids tend to stability and good workability, they also tend to produce in such compositions as these a cloudy and high expansion glass which it is desired to avoid.

Glass $B_2$ has gone into extensive commercial use in the manufacture of baking dishes, and chemical ware, many thousands of which have been sold, and has been tested by the Bureau of Standards, who find its linear expansivity to be .0000033; its true internal heat conductivity to be .0028; its density to be 2.246. Other tests show its true tensile strength to be 16 kg. per sq. mm.; its Young's modulus to be 6530, giving a true coefficient of thermal endurance $\left(\dfrac{F}{3}\right)$ of 19. Its hardness, as defined above, is 800° C., and its stability also as defined above is .00015 grams. Its specific heat is .20. Using a factor for tensile strength comparable with the factors used by Winkelmann and Schott, its co-efficient of thermal endurance $\left(\dfrac{F}{3}\right)$, is about 10.

Having thus described our invention, what we claim, and desire to secure by Letters Patent is stated in the following claims, in certain of which the term "acid" is used as indicating the oxids of aluminum and antimony—

1. A glass containing silica, alumina, boric oxid and sodium oxid only, the silica being not under 70 per cent., and the alumina being not over 3 per cent. of the total, and the percentage of boric oxid to sodium oxid being not less than two to one.

2. A glass containing silica, alumina, boric oxid and sodium oxid, without oxids of the second group of the periodic system, or the reducible oxids of lead or antimony, the silica being not under 70 per cent., and the alumina being not over 3 per cent. of the total, and the percentage of boric oxid to sodium oxid being not less than two to one.

3. A glass containing not under 70 per cent. and not over 90 per cent. silica and alumina, boric oxid and an alkali oxid, the boric oxid being not less than 60 per cent. or more than 70 per cent. of the combined alumina, boric oxid and alkali oxid contents.

4. A glass containing not under 70 per cent. and not over 90 per cent. silica and containing alumina, boric oxid and alkali oxid, without oxids of the second group of the periodic system, the boric oxid being not less than 60 per cent. or more than 70 per cent. of the combined alumina, boric oxid and alkali oxid contents.

5. A glass containing not under 76 per cent. silica and also containing boric oxid, the boric oxid comprising not less than 60 per cent. of ingredients other than silica.

6. A glass having the stability better than 0.002 grams per 100 sq. cm. and a hardness no greater than 900° C. and containing not under 76 per cent. silica and also containing boric oxid, the boric oxid comprising not less than 60 per cent. of ingredients other than silica.

7. A glass containing between 76 and 90 per cent. silica; between 6 and 14 per cent. boric oxid, and also containing sodium oxid and alumina.

8. A glass containing silica, boric oxid and alkali, the boric oxid and alkali forming not less than 6 per cent. of the glass, the glass having linear co-efficient of expansion less than .0000036.

9. A glass containing silica, boric oxid and alkali, the boric oxid and alkali forming not less than 6 per cent. of the glass, and the boric oxid being to the alkali in the ratio of at least two to one, the glass having a linear co-efficient of expansion of less than .0000036.

10. A glass containing silica, boric oxid and alkali without oxids of the second group of the periodic system, or the reducible oxids of lead or antimony, the boric oxid and alkali forming not less than 6 per cent. of the glass, the glass having linear co-efficient of expansion of less than .000004.

11. A transparent glass containing over 70 per cent. silica, and having a linear co-efficient of expansion of less than .0000036 and a hardness not greater than 800° C.

12. A transparent glass containing more than 79 per cent. silica and having a linear co-efficient of expansion less than .000004, and a hardness not greater than 850° C.

13. A glass having a hardness not greater than 850° C.; a co-efficient of thermal endurance $\left(\frac{F}{3}\right)$ greater than six, and stability of 0.002 g. or better per 100 sq. cm.

14. A glass having a hardness not greater than 850° C., a linear co-efficient of expansion of less than .0000036, and thermal co-efficient of endurance $\left(\frac{F}{3}\right)$ greater than six.

15. A glass having linear expansivity less than 0.000004, stability better than 0.002 grams per 100 sq. cm. and hardness not greater than 850° C.

16. A glass containing silica and boric oxid and having linear expansivity less than 0.000004 and stability better than 0.002 grams per 100 sq. cm.

17. A glass having hardness not greater than 820° C. and linear expansivity less than .0000036.

18. A glass having a hardness not greater than 820° C., a linear expansivity less than 0.000004, and a stability better than 0.002 grams dissolved matter per 100 sq. cm.

19. A glass containing at least 76 per cent. silica and containing at least one other acid oxid and a basic oxid, the molecular ratio of the acid oxid contents except such as are due to silica to the basic oxid contents being at least two to one.

20. A glass containing at least 76 per cent. silica and containing at least one other acid oxid and a basic oxid, the percentage ratio of the acid oxid contents except such as are due to silica to the basic oxid contents being at least two to one.

21. A glass containing silica and not more than two other acidic oxids, one of which may be alumina and only one basic oxid; the molecular ratio of the acidic oxid contents, except such as are due to silica and alumina, to the basic oxid contents being at least two to one.

22. A glass containing at least two acidic constituents and only one basic constituent, and having linear expansivity less than 0.000004.

23. A glass containing silica and not more than two other acidic constituents and only one basic oxid constituent, and having linear expansivity less than .000004.

24. A glass containing between 76 per cent. and 85 per cent. silica, over 9% of another acid oxid, and over 3% of a basic oxid.

25. A glass containing over 76 per cent. silica and having linear expansivity less than 0.000004 and hardness not greater than 820° C.

In testimony whereof we have signed our names.

EUGENE C. SULLIVAN.
WILLIAM C. TAYLOR.